J. T. BARBER.

DEVICE FOR BINDING TOGETHER LUMBER, &c.

No. 10,817. Reissued Mar. 15, 1887.

Witnesses.

Robert Emmett,

Geo. W. Rea.

Inventor.

James T. Barber.

By James L. Norris.

Atty.

N. PETERS, Photo-Lithographer, Washington, D. C.

UNITED STATES PATENT OFFICE.

JAMES T. BARBER, OF HANNIBAL, MISSOURI.

DEVICE FOR BINDING TOGETHER LUMBER, &c.

SPECIFICATION forming part of Reissued Letters Patent No. 10,817, dated March 15, 1887.

Original No. 338,334, dated March 23, 1886. Application for reissue filed December 21, 1886. Serial No. 222,221.

*To all whom it may concern:*

Be it known that I, JAMES T. BARBER, residing at Hannibal, in the county of Marion and State of Missouri, and a citizen of the United States, have invented a new and useful Improvement in Devices for Binding Together Lumber, Timber, &c., of which the following is a full description, reference being had to the accompanying drawings, in which—

Figure 1:
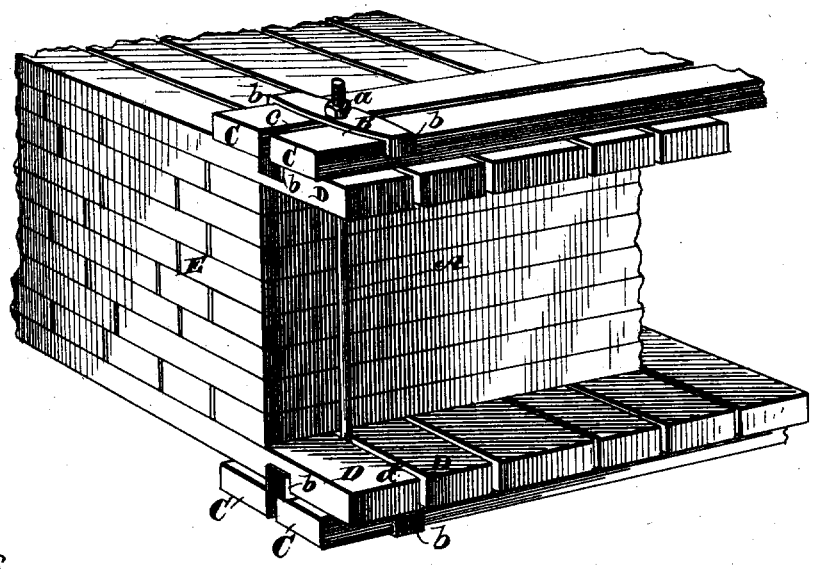
Figure 6:
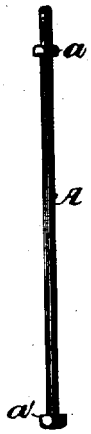
Figure 2:
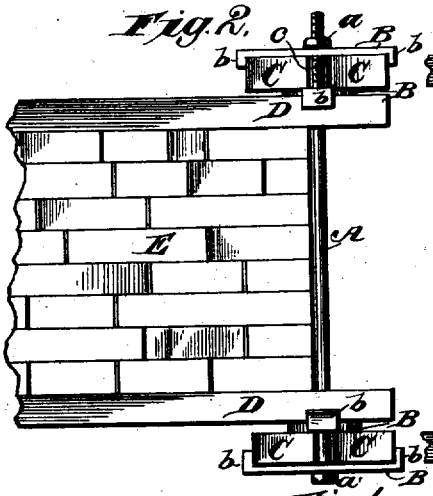
Figure 3:
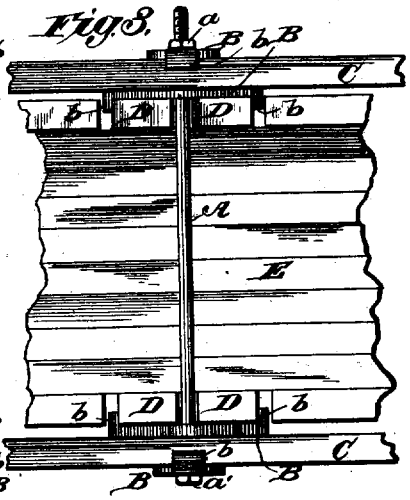
Figure 4:
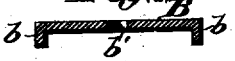
Figure 5:
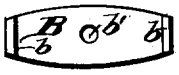

Figure 1 is a perspective view showing a corner of a pile of lumber with the binding devices attached; Figs. 2 and 3, side elevations, showing different sides with the binding devices in place; Fig. 4, a longitudinal section of one of the clamping plates; Fig. 5, an inner face view of one of the clamping-plates; Fig. 6, a detail of the clamping-rod.

This invention is mainly designed for use in binding together pieces of lumber of various kinds, timbers, &c., to construct a crib or raft to be transported by water, and has for its objects to bind the pieces forming the crib or raft firmly together without injury to the pieces, and by use of some of the pieces which constitute the crib or raft.

The objects of my invention I accomplish in the manner and by the construction of devices hereinafter described and claimed.

In the drawings, A represents a clamping-rod, made of round iron, as shown, or of other suitably-shaped rod, one end having a screw-thread to receive a nut, *a*, and the other being provided with a head, *a'*.

B represents the clamping-plates, each formed of a flat portion having at each end a turned flange, *b*, the body having an opening, *b'*, for the passage of the rod A.

C represents the upper and lower binding-strips, formed of the pieces composing the crib and raft.

D represents clamping-pieces, formed by projecting a row of the pieces at the top and bottom beyond the main portion of the crib or raft, as shown in Figs. 1 and 2.

E is the main portion of the crib or raft.

The rods A are to be of a length for the depth of the crib or raft, and the clamping-plates B are to be of a width to have the space between the tips or points *b* receive the pieces C D, by which the clamping of the crib or raft together as a whole is accomplished in connection with the rods and clamping-plates, a rod and four clamping-plates being used at each corner of the crib or raft. In the drawings, however, one corner only is represented, the other corners having a similar arrangement.

In use the lower plate B has placed thereon in the arrangement shown the lower cross-pieces C, the rod passing up through the hole *b'* and between a space, *c*, left between the pieces C for this purpose. Another plate, B, is then slipped onto the rod and arranged crosswise in relation to the first plate B. The lower series of pieces D are then placed on the lower strips C, the two pieces at each side lying within the tips *b* of the second plate B, as shown in Fig. 1, a space, *d*, being left between the two pieces for the passage of the rod A. The body E of the crib is then piled onto the lower pieces D, as usual, until the desired height is reached, when a row of pieces D, running in a corresponding direction with the lower pieces D, is projected, and a clamp, B, placed over the first two, as shown in Fig. 1, the pieces coming into engagement with the tips or points *b*, and having a space, *d*, between them for the passage of the rod A. The cross-strips C for the top are then placed over the top pieces D, and a clamp-plate, B, dropped over them, as shown in Figs. 1 and 2, and then the nut *a* is screwed down, drawing the pieces forming the raft together and holding them firmly in place by the clamping-pieces C D.

When necessary or desirable, the plates B and clamping-rod A can be applied to the sides and ends of the raft or crib in the same manner as applied to the corners, such application being shown in Fig. 3, the lower clamping-plate B receiving the cross-strips C, the next clamping-plate receiving two of the pieces D, and the first upper clamping-plate receiving the top pieces D, and a clamping-plate, B, being placed over the upper pieces C, the rod A passing through the clamping-plates and through openings *c d*, left between the respective pieces C D for this purpose. It will be seen by this arrangement that the clamping-pieces do not have to be bored or otherwise mutilated for the passage of the clamping-rods, as such rods pass between the pieces; and it will also be seen that the plates B standing crosswise to each other, and being drawn firmly to the clamping-pieces C D by the rods A, no racking or displacement of the plates can occur, as movement in any direction is prevented by the ears or flanges *b* of the plates, which resist movement in all directions of the clamping-pieces, and as long as the clamping-pieces remain in position the body of the crib or raft will be held firmly together.

The devices are very simple, and can be readily and quickly applied to the crib or raft, and in tearing the raft to pieces no obstruction will occur by reason of the clamping-plates, as the nuts *a* can be removed, the upper clamping-plates B withdrawn to allow the top strips C to be removed, and so on until the entire raft is taken apart.

What I claim as new, and desire to secure by Letters Patent, is—

As a device for binding lumber, the combination, with part of the timbers composing the raft or crib, C and D, crossing each other, of plates interposed between and upon said timbers C and D and having points or tips which engage with the timbers C and D without injury thereto, and the headed clamping-bolts A, passing through all of said plates and between said crossed timbers C and D, substantially as described.

JAMES T. BARBER.

Witnesses:
J. W. TREAT,
W. T. MILROY.